Sept. 22, 1942.   E. H. WELLECH   2,296,321
GLASS FORMING APPARATUS
Filed July 16, 1938   2 Sheets-Sheet 1
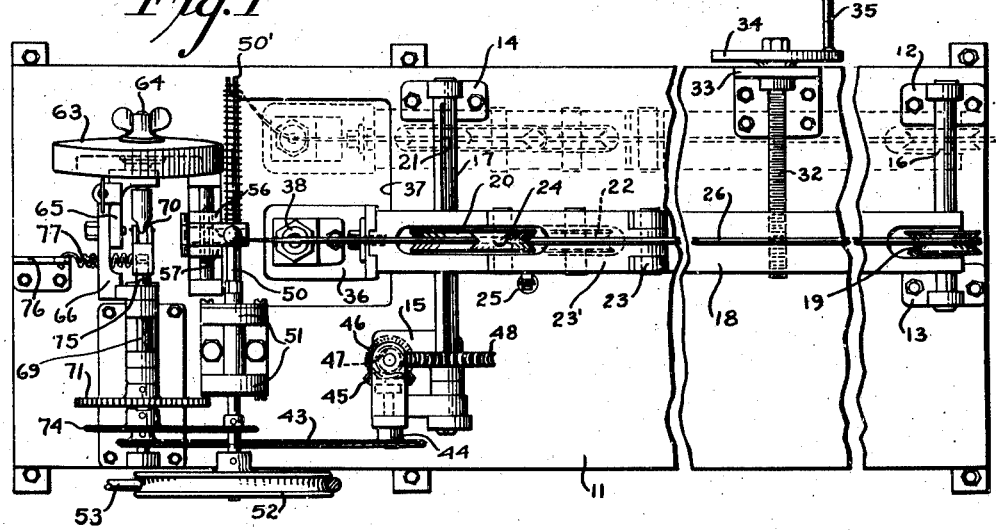
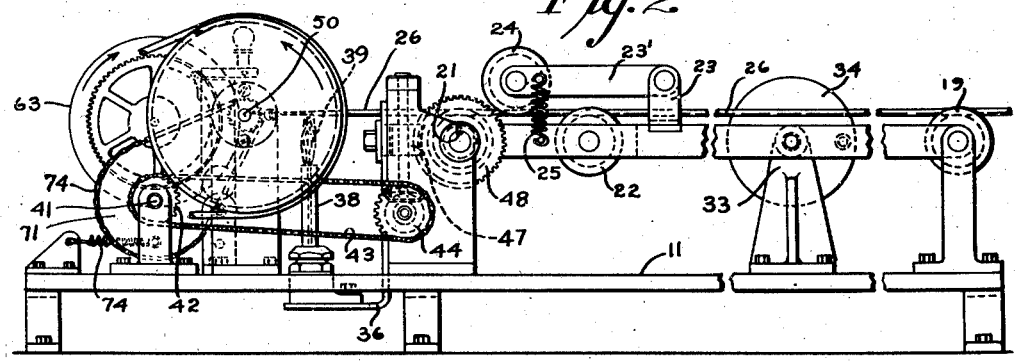
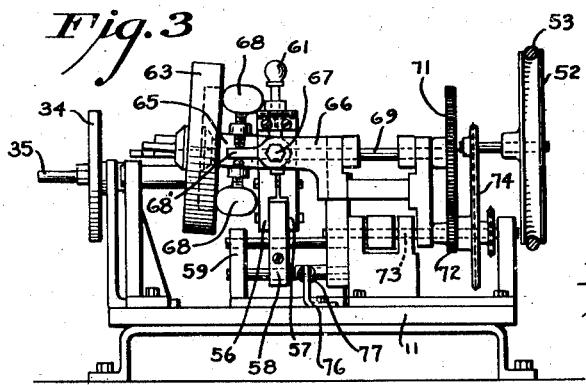
INVENTOR.
EDMUND H. WELLECH
BY Dorsey, Colt & Garner
ATTORNEYS.

Sept. 22, 1942.  E. H. WELLECH  2,296,321
GLASS FORMING APPARATUS
Filed July 16, 1938  2 Sheets-Sheet 2
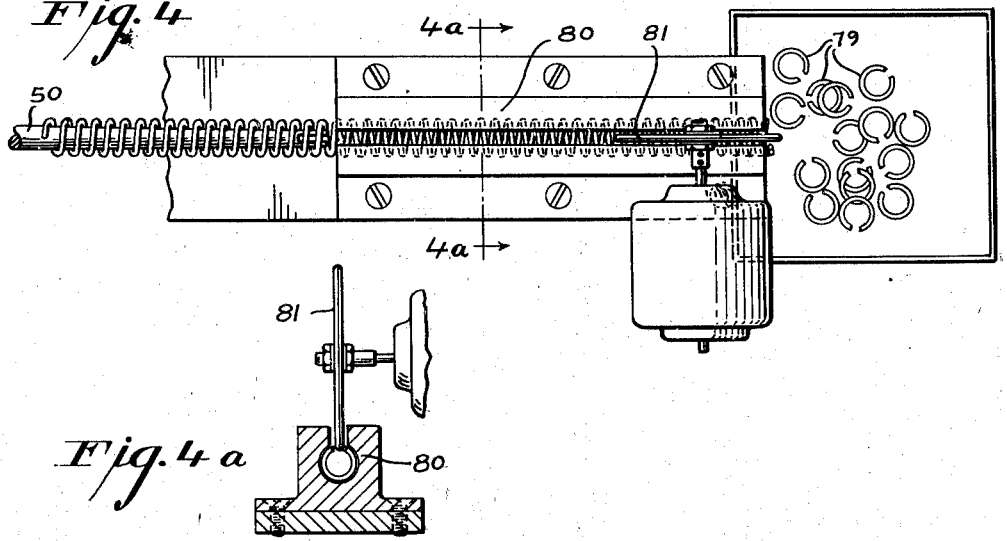
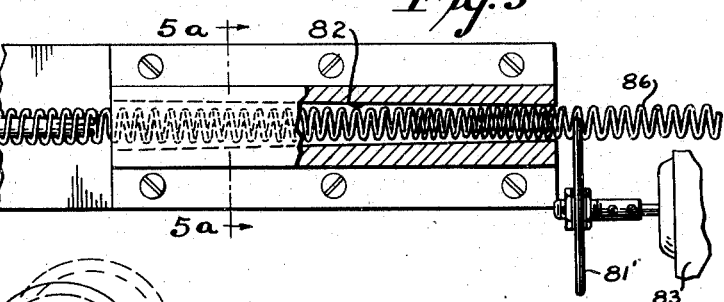
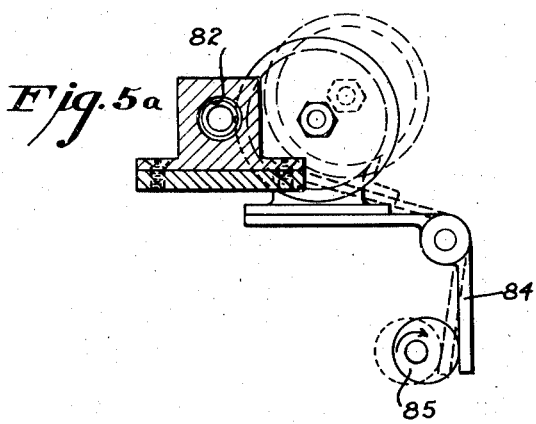
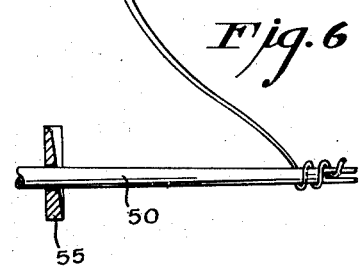
INVENTOR.
EDMUND H. WELLECH
BY
ATTORNEYS.

Patented Sept. 22, 1942

2,296,321

UNITED STATES PATENT OFFICE 2,296,321

GLASS FORMING APPARATUS

Edmund H. Wellech. Corning, N. Y., assignor to Corning Glass Works, Corning, N. Y., a corporation of New York Application July 16, 1938, Serial No. 219,640

6 Claims. (Cl. 49—7)

The present invention relates to glass forming apparatus and particularly to apparatus suitable for the quantity production of spirally wound glass stock and its conversion into helices. It has for some time been appreciated that such material is excellent for use as chemical tower packing, but so far as applicant is aware, no satisfactory method for its quantity production has heretofore been devised.

An object of the present invention is the economical production of helices of indefinite length.

A further object is the separation of a helix into helices of any desired predetermined length.

The invention embodies among its features means for continuously drawing and winding plastic glass from a parent supply body into a spiral or helix of unlimited length.

The invention also embodies means for separating a helix into helices of predetermined lengths.

In the accompanying drawings

Fig. 1 is a plan view of one form of apparatus embodying the invention, for winding helices of unlimited lengths;

Figs. 1a—1c are enlarged fragmentary parts of Fig. 1;

Fig. 2 is a side elevation of Fig. 1;

Fig. 3 is an end elevation of Figs. 1 and 2;

Fig. 4 is a plan view illustrating one form of apparatus embodying the invention for separating a helix, being fed from the apparatus shown in Figs. 1–3, into helices of less than one turn;

Fig. 4a is a sectional elevation taken on line 4a—4a of Fig. 4;

Fig. 5 is a view similar to Fig. 4 illustrating an alternative form of apparatus embodying the invention for separating a helix into helices of one or more turns;

Fig. 5a is a sectional elevational taken on line 5a—5a of Fig. 5; and

Fig. 6 is a view illustrating a modified method of supplying plastic glass to the winding apparatus of Figs. 1–3.

The invention, as illustrated, includes means for winding a filament of plastic glass supplied from the heated end of glass cane or rod, or, alternatively, directly from a forehearth outlet, onto a rotating spindle and means for progressively drawing the set glass off such spindle in the form of a helix. The invention, as illustrated, also includes means for feeding the free end of such helix to a device which separates the same into helices of slightly less than one turn, or alternatively feeding such helix to a device which separates the helix into helices of any desired number of turns.

In the drawings the apparatus illustrated in Figs. 1–3 includes a base 11 upon which both the feeding and spiral or helix winding apparatus is assembled. The feeding apparatus is for the most part supported by brackets 12—15 drilled to acommodate shafts 16 and 17 which support a glass cane feeding carriage 18 suitably pierced to receive the shafts. The end of the carriage supported by shaft 16 is bifurcated as necessary to allow space for a cane supporting pulley 19 freely rotatable upon the shaft and laterally slidable thereon with the carriage. The end of the carriage through which the shaft 17 passes is slotted vertically to accommodate a cane drive pulley 20. This pulley is adapted to be rotated by shaft 17 through a key (not shown). Such key is slidable with the pulley in a groove 21 in shaft 17, enabling lateral movement of the pulley and carriage on shaft 17. A second glass cane supporting pulley 22 is also arranged in the right hand end of the slot occupied by pulley 20.

The carriage 18, at a point intermediate to the shafts 16 and 17, is provided with a support 23 on the upper end of which is pivoted a lever 23′, the free end of which has journaled in it a pulley 24. A spring 25, extending between the lever 23′ and the carriage tends to force the pulley toward the carriage and to snugly hold a piece of glass cane 26 against the drive pulley 20.

The carriage 18 also, at a point intermediate the pulleys 19 and 22, is transversely drilled and tapped to receive a carriage shifting screw 32. The other end of this screw is suitably journaled in a bracket 33 and is provided with a disk 34 having a crank 35 through the medium of which the carriage can be shifted horizontally on shafts 16 and 17, as is essential when starting the forming operation, as will be fully described hereinafter.

The end of the carriage adjacent shaft 17 has fixed thereto a burner supporting bracket 36 which extends down through a suitable aperture 37 in the base 11. A burner 38 is mounted on bracket 36 and is adapted to direct its flame 39 onto the end of the cane 26 and heat it to plasticity. The cane is advanced into the flame by pulley 20 which is driven at the proper speed from a shaft 41 (Fig. 2) constituting a part of the spiral winding apparatus. The drive includes a sprocket wheel 42, a chain 43, a sprocket wheel 44 and a train of gears 45—48 (Fig. 1).

The helix forming apparatus comprises a winding spindle 50 mounted in bearings 51 and carrying a suitable pulley 52 driven by a belt 53 from a suitable source of power (not shown). The spindle 50 passes through a spiral forming shoe 55 (Figs. 1b and 1c) clamped between upright members 56 and 57, supported on a vertical bar 58 (Fig. 3) laterally slidable on a frame 59. The shoe face 55' is of such shape that a strand of plastic glass 54 being wound on the spindle engages the shoe which imparts a definite pitch to the glass. The upright members 56—57 at their extreme top have hinged thereto an adjustable pitch control assembly including a pitch control vane 60 adapted to be lowered adjacent the strand of glass 54 engaging the shoe (Fig. 1b) and adapted to be rotated by a knob 61 and held in the angular position to which it is rotated by a set screw 62, so that the pitch given the glass by shoe 55 can, when desired, be modified before the glass has had time to become fully set.

The spindle 50 at its free end 50' is bifurcated to enable a filament of glass to be initially threaded thereto when starting the winding operation, as will be fully described hereinafter.

To the left of the spindle, having reference to Figs. 1 and 2, is arranged an adjustable glass drawing disk 63 composed of fibre or other suitable friction material, and adjusted to engage and draw glass off the spindle 50. This disk is mounted on a stub shaft 64 passing through a suitable bearing in a supporting bracket 65 in turn pivotally supported on a bracket 66 by a cap screw 67. Wing screws 68 are threaded through ears comprising parts of bracket 65 into engagement with an extending tongue 68' of bracket 66 and enable the angle of the disk to be modified with respect to the spindle 50 to suitably adjust the rate of draw. The disk 63 is driven by a shaft 69 through a flexible coupling 70. The shaft 69 is rotated by a gear wheel 71 in mesh with a driving pinion 72 carried by a shaft 73 in turn rotated by a chain 74 geared to the spindle 50. The bracket 66 supporting the friction disk 63 is rotatable about the shaft 73 for a limited distance so as to enable the disk 63 to be moved away from the spindle, as is essential when initiating the winding operation, but is normally held in the position shown under tension of a spring 77 extending between a pin 75 carried by bracket 66 and a bracket 76 mounted on base 11.

*Operation*

To initiate the operation of the foregoing apparatus, a piece of cane 26 is arranged on pulleys 19, 20 and 22 with its one end over flame 39 and the crank 35 operated to shift the carriage to the position indicated by interrupted lines. After the end of the cane has become suitably plastic, a filament of glass is manually drawn therefrom and threaded into the fork 50' of the spindle. The drawing disk is then held clear of the spindle, rotation of the spindle started, and the crank 35 operated to return the carriage to its initial position. As the carriage passes alignment with drawing disk 63, such disk is allowed to engage the spindle under tension of its spring 77, thereby enabling it to draw the glass off the spindle. Owing to the substantial alignment of the cane 26 with the shoe 55, the filament finally engages the shoe after which the vane 61 may be lowered to assist in maintaining the pitch being imparted by the shoe or in modifying such pitch if desired.

The length of helix which can be drawn is only limited by its ability to withstand the turning action after leaving the spindle, as additional lengths of cane may be fused to the one on the machine without interrupting the operation.

Instead of using cane as the parent supply body of glass and the feeding apparatus illustrated in Figs. 1–3, plastic glass may be fed to the spindle directly from the bottom outlet of a forehearth, as illustrated in Fig. 6.

When single turn units 79 suitable for use as tower packing material are desired, the helix is fed from the spindle into a slotted tube 80 (Figs. 4 and 4a) and is progressively fed under a motor driven abrasive disk 81 which separates the helix into such units.

In case the use requires helices of more than one turn, the apparatus illustrated in Figs. 5 and 5a is employed. In this instance the helix is fed into a tapered slotted tube 82 which at the exit end holds the protruding part of the helix with sufficient rigidity to enable an abrasive disk 81' oscillated into engagement with a turn of the free part of the helix to separate it from that within the tube. As illustrated in Fig. 5a, the disk 81' and its driving motor 83 are carried on a pivoted bell crank 84 oscillated by a cam 85 driven at a speed dependent on the length of helices 86 desired.

Although the material wound onto the mandrel is herein referred to as a filament, it should be understood that this term is used in an arbitrary sense and is intended to cover glass wires of a wide range of diameters.

I claim:

1. In a glass drawing apparatus, a mandrel supported at one end only and bifurcated at the other end, a carriage arranged in cooperative relation with said mandrel for supporting a supply body of glass, means associated with the carriage for heating the supply body to plasticity at a location with respect to the mandrel enabling the convenient drawing of a filament from the supply body into the bifurcation of the mandrel, means for progressively feeding said body to said heating means, means for rotating the mandrel to draw and wind the filament thereon, manual means for shifting the carriage as the winding proceeds to such position that part of the filament is wound upon the mandrel and means to thereafter hold the filament in drawing relation with the mandrel and to force the filament originally threaded through the bifurcation and that subsequently drawn and wound upon the mandrel off the same.

2. In apparatus for forming a continuous helix from glass, a rotatable mandrel having an unsupported bifurcated end, means for supplying a body of plastic glass from which a filament may be drawn and threaded into the bifurcation of said mandrel, means for rotating said mandrel to form a helix from the filament, and means cooperative with a part of the helix and with said mandrel to progressively drive the helix off the bifurcated end of said mandrel as it is formed and to force rotation of the helix with the mandrel to continue drawing said filament from the supply body of plastic glass and the formation of the helix.

3. In a glass working apparatus, means for supplying a body of plastic glass, a mandrel supported at one end and bifurcated at the other end, means for rotating said mandrel to wind a filament thereon which has been drawn from said supply body and threaded into the bifurcation, manual means for shifting the position of the supply body to initiate winding of the filament into a spiral from the bifurcated end toward the supported end of the mandrel, and means cooperative with the mandrel for removing the spiral from the bifurcation and from the mandrel, said means preventing rotation of the spiral relative to the mandrel so that the drawing and winding of the filament thereon is continued during removal of the spiral from the mandrel.

4. In a machine for forming a glass helix, a support, a rotatable mandrel mounted on said support having a forked end, a carriage having rotatable supports for a glass rod serving as a supply body from which the helix may be formed, means mounted on the carriage and arranged intermediate the mandrel and said rotatable supports for heating an end of the rod to plasticity enabling the manual drawing of a filament therefrom and threading of the same into the forked end of the mandrel, means for rotating one of said rotatable supports to progressively advance the rod into the field of influence of said heating means, means to rotate said mandrel to wind the filament thereon, manual means for shifting said carriage along a path parallel to the axis of the mandrel to initiate the winding of the filament into a helix extending toward the opposite end of the mandrel and a disk in cooperative relation with the mandrel and filament thereon and operative to continue drawing and winding of the filament and to progressively force the wound filament off the forked end thereof.

5. In a machine for winding spirals, means for supplying a body of plastic glass, a mandrel having a bifurcated free end and being rotatably supported at the opposite end, a shoe associated with a portion of said mandrel intermediate its ends, means for rotating said mandrel to wind plastic glass drawn from the supply body and threaded into the bifurcation of said mandrel onto said mandrel, manual means for so shifting the supply body from which the plastic glass is drawn that glass wound on the mandrel finally contacts said shoe, a drawing disk mounted for rotation about an axis angularly disposed with respect to that of the mandrel and arranged intermediate said shoe and the bifurcated end of said mandrel, means to resiliently hold the peripheral surface of said disk tangentially against the glass being wound on said mandrel, and means for rotating said disk in a direction to push the glass wound on the mandrel off its bifurcated end and to force rotary movement of the glass with the mandrel whereby glass continues to be drawn and wound on that portion of the mandrel between said shoe and disk.

6. In a machine for winding helices of glass, a rotatable mandrel having an unsupported end bifurcated to receive the free end of a filament of plastic glass, a carriage having aligned pulleys supporting a rod of glass in a plane normal to the axis of the mandrel, means associated with the carriage for applying heat to the one end of the rod to melt it to plasticity to enable a filament to be drawn therefrom and threaded into the bifurcation of the mandrel, means for rotating the mandrel to continue drawing and winding of a filament thereon from the glass which has been rendered plastic, manual means for shifting said carriage in a direction to cause the glass wound on the mandrel to extend from the unsupported end thereof, means for rotating one of said pulleys at the proper speed to progressively advance the rod into the field of influence of said heating means to maintain a supply of plastic glass available, and means cooperative with said mandrel to slide the wound filament off the bifurcated end of said mandrel and to prevent turning of the filament on the mandrel to cause drawing and winding of the filament to be continued.

EDMUND H. WELLECH.